Feb. 20, 1962     A. D. PALMER     3,021,612
TEACHING DEVICE
Filed Jan. 18, 1961
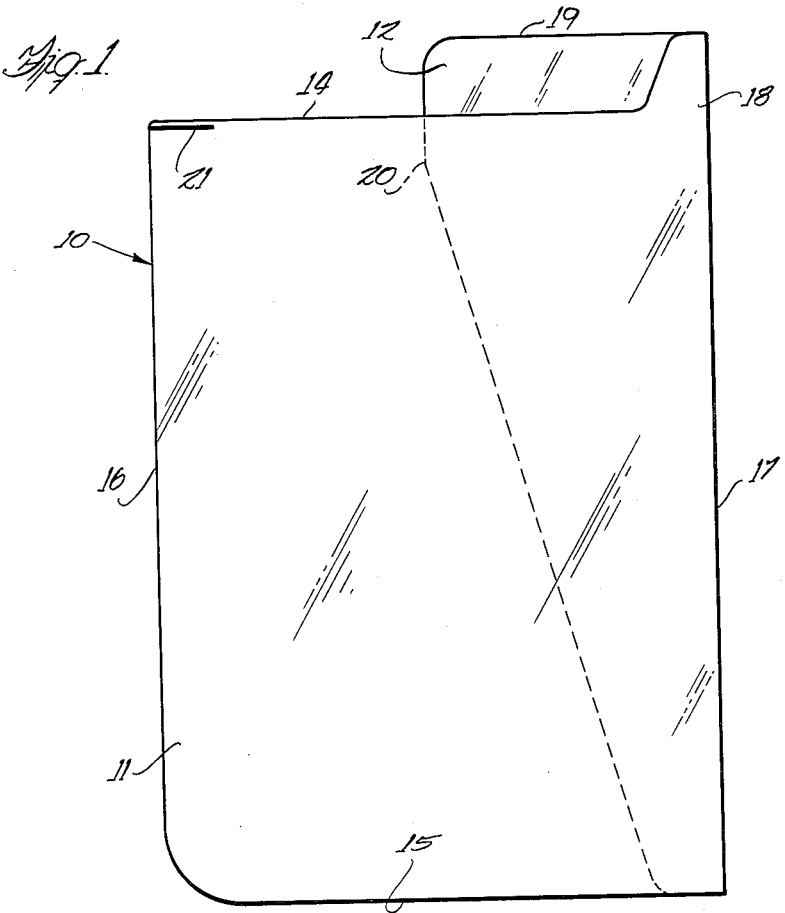
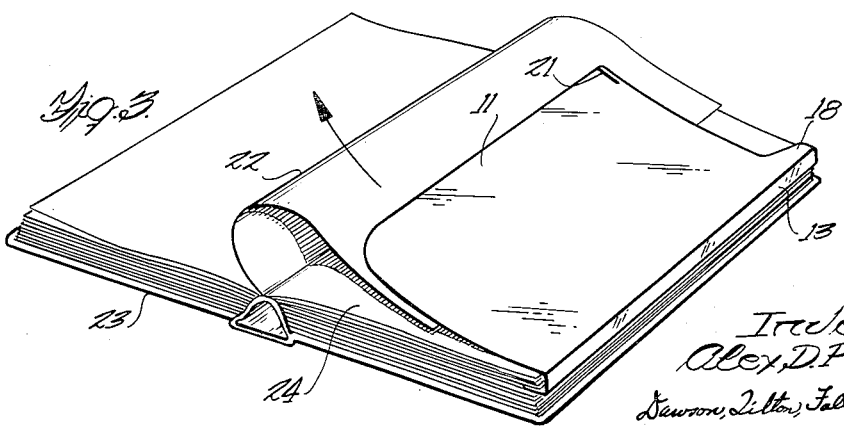
Inventor
Alex. D. Palmer
Dawson, Tilton, Fallon & Lungmus
Attorneys

United States Patent Office 3,021,612
Patented Feb. 20, 1962

3,021,612
TEACHING DEVICE
Alex D. Palmer, Chicago, Ill.
(915 Dempster, Evanston, Ill.)
Filed Jan. 18, 1961, Ser. No. 83,568
7 Claims. (Cl. 35—9)

This invention relates to a teaching device, and more specifically, to a device adapted for use with printed program material for the self-instruction of a user.

Teaching machines and devices—that is, machines and devices which may be manipulated by a user to present printed questions for improving the user's comprehension and retention of subject matter to which he has been previously exposed—have received favorable and increasing recognition as valuable aids to education. A student using such a device in combination with programmed self-instruction sheets may proceed at a pace tailored to his own learning capabilities. Ordinarily, the answering of each of the questions exposed by the teaching device requires a thorough understanding of the subject matter covered by preceding questions and, therefore, an individual is often able to master subjects which he might fail to learn solely through classroom exposure. Furthermore, such devices tend to improve the reading ability of a user and to reinforce the learning process at a time when such reinforcement is considered to be particularly beneficial.

Despite their usefulness, teaching machines and devices generally have the undesirable characteristics of being both cumbersome and expensive. Portability, simplicity and durability are frequently lacking in the available teaching devices and the high initial cost of such devices tends to discourage their acquisition by individuals who, in contrast to educational groups, would stand to benefit the most from their private use.

Accordingly, it is a principal object of the present invention to provide a teaching device which overcomes the aforementioned defects and disadvantages of present structures. Another object is to provide a teaching device of extremely simple and inexpensive construction for use in combination with programmed self-instruction sheets. Other objects will appear from the specification and drawings in which:

FIGURE 1 is a plan view of a teaching device embodying the present invention;

FIGURE 2 is an end view of the device shown in FIGURE 1;

FIGURE 3 is a perspective view of the device in combination with a book and showing the operation of the device as a page of the book is being turned.

In the embodiment of the invention illustrated in the drawings, the numeral 10 generally designates a teaching device comprises a cover panel 11, a back panel 12 and a side wall 13. It is essential that the cover panel be formed from an opaque or non-transparent sheet of flexible material and, in the illustration given, both panels and the side wall are integrally formed from the same sheet. In addition to flexiblity and non-transparency, the sheet material should be substantially unbreakable and non-deformable during ordinary use of the device. Flexible plastic materials such as polystyrene, polyethylene, or cellulose acetate might be used as well as any other materials having similar properties of flexibility, durability and non-deformability.

As shown in FIGURE 1, the cover panel 11 is substantially rectangular in shape, having top, bottom and side edges 14, 15, 16 and 17 respectively. The right side edge 17 is straight and is disposed at right angles to top edge 14. The cover is provided with an upper right side extension 18 which projects above edge 14 and which merges with side wall 13.

Referring to FIGURE 2, it will be observed that the cover and back panels extend along spaced parallel planes. The width of the rear or back panel 12 is substantially less than the width of the front cover panel 11; in the illustration given, the former is approximately one half the width of the latter. In FIGURE 1 it will be seen that the rear panel projects upwardly above the top edge 14 of the front cover panel and has its upper edge 19 merging with the upper edge of extension 18 and extending at substantially right angles to side edge 17. From a point 20 along the left margin of the rear panel and below the upper edge 14 of the front panel, the rear panel tapers downwardly. Thus, the rear or back panel has its maximum width at its upper end and its minimum width at its lower end.

Adjacent the upper left corner of the front sheet 11 is an index line 21 parallel with the upper edge 14. This line may be imprinted or otherwise applied to the front panel and is intended to be aligned with similar markings on a program sheet during the operation of the device, as will now be described.

In operation of the device, one or more program sheets are inserted into the space between the front and back panels 11 and 12 so that the right edges of the sheets bear against side wall 13 and the left margins of the sheets are exposed laterally beyond side edge 16. Proper alignment of the device is assured by the engagement between the edges of the printed program sheets and side wall 13. The device is initially positioned so that the printed matter upon the uppermost program sheet is covered by the non-transparent front cover panel 11.

Each printed self-instruction program sheet bears a list of printed questions and the printed answers to those questions directly therebelow. Along the left margin of each sheet are printed marks or lines positioned to register with line 21 as the device is slid downwardly over the sheets. By successively aligning mark 21 with the complementary marks upon the program sheet, the user successively exposes the printed questions of the program sheet above the top edge 14. After each question has been studied and he has arrived at an answer, the user simply slides the device a short distance downwardly to expose the proper answer printed on the program sheet.

The upward extension 18 and the projection of rear panel 12 above front cover panel 11 tend to prevent tipping movement of the device even when upper edge 14 is near the bottom of the program sheet and to prevent release of the device from the sheet or sheets disposed between the front and rear panels. Device 10 is easily slidable along the program sheet or sheets because of the smooth surfaces of the device and because of the limited contact between tapered rear panel 12 and the rear surface of the inserted sheet. Such limited contact is of particular significance when the program sheets are connected in book form and rear panel 12 may be sandwiched between the pages of that book, as illustrated in FIGURE 3.

FIGURE 3 shows a program sheet 22 of book 23 as it is being removed from beneath the cover 11 of the teaching device. Such removal is greatly facilitated by the flexibility of the front cover 11 which, it will be noted, is curved upwardly away from the next sheet 24 of the book. When leaf or sheet 22 has been fully turned, the user may then proceed to study and answer the printed questions presented on sheet 24.

While in the foregoing I have disclosed an embodiment of the invention in considerable detail for purposes of illustration, it will be understood by those skilled in the art that many of these details may be varied without departing from the spirit and scope of the invention.

I claim:

1. A teaching device adapted for use with programmed self-instruction sheets comprising a pair of panels extending along spaced parallel planes and having a pair of straight adjacent side edges, a straight side wall connecting said straight side edges together, said wall being slidably engagable with an edge of at least one programmed self-instruction sheet received between said panels for guiding movement of said device along said sheet, one of said panels comprising a cover panel and being formed from flexible and opaque sheet material.

2. The structure of claim 1 in which said panels and said side wall are integrally formed from flexible and opaque plastic sheet material.

3. The structure of claim 1 in which the other of said panels comprises a rear panel having an upper portion projecting above the upper edge of said cover panel.

4. The structure of claim 3 in which said rear panel is narrower than said cover panel and tapers downwardly.

5. The structure of claim 1 in which said cover panel is provided with an index marking along the edge thereof opposite from said side wall and adjacent its upper edge for alignment with location markings upon said self-instruction sheet.

6. A teaching device for use with programmed self-instruction sheets comprising a pair of spaced parallel front and rear panels joined together along one side by a straight side wall, said panels and said side wall being integrally formed from non-transparent flexible sheet material, said front panel having a top edge extending at right angles to said joined side, and said rear panel and said side wall projecting upwardly beyond the top edge of said front panel, said rear panel being narrower than said front panel and tapering downwardly.

7. A teaching device for use with programmed self-instruction sheets comprising a pair of spaced parallel front and rear panels joined together along one side by a straight side wall, said panels and said side wall being integrally formed from non-transparent flexible sheet material, said front panel having a top edge extending at right angles to said joined side, and said rear panel and said side wall projecting upwardly beyond said top edge of said front panel, said front panel being provided with an index mark alignable with complementary markings provided by the uppermost of a plurality of programmed self-instruction sheets receivable between said front and rear panels.

References Cited in the file of this patent

UNITED STATES PATENTS

| | | |
|---|---|---|
| 680,311 | Browne | Aug. 13, 1901 |
| 1,350,186 | Straubel | Aug. 17, 1920 |
| 1,500,777 | Stevenson | July 8, 1924 |
| 2,234,075 | Carolin | Mar. 4, 1941 |